No. 738,533. Patented September 8, 1903.

UNITED STATES PATENT OFFICE.

ARTHUR EICHENGRÜN AND THEODOR BECKER, OF ELBERFELD, GERMANY, ASSIGNORS TO FARBENFABRIKEN OF ELBERFELD CO., OF NEW YORK, N. Y., A CORPORATION OF NEW YORK.

PLASTIC COMPOSITION.

SPECIFICATION forming part of Letters Patent No. 738,533, dated September 8, 1903.

Application filed February 3, 1902. Serial No. 92,459. (No specimens.)

*To all whom it may concern:*

Be it known that we, ARTHUR EICHENGRÜN and THEODOR BECKER, doctors of philosophy, chemists, residing at Elberfeld, Germany, (assignors to the FARBENFABRIKEN of ELBERFELD CO., of New York,) have invented a new and useful Improvement in Plastic Compositions; and we do hereby declare the following to be an exact and clear description of our invention.

We have found that plastic and translucid celluloid-like compounds, which are much less inflammable than, for example, the plastic compounds made with nitrocellulose, can be prepared by replacing in the usual process for preparing celluloid the pyroxylin (nitrocellulose) by such acetylized derivatives of cellulose as leave behind a flexible film on evaporating their solutions. The results of the said new process are celluloid-like products possessing valuable properties.

In carrying out our new process practically we can proceed as follows, the parts being by weight: A mixture of one hundred parts of acetylized cellulose (obtained by the action of acetic anhydrid and sulfuric acid on cellulose at ordinary temperature) and fifty parts of camphor is triturated with chloroform or glacial acetic acid. After some hours and on gently heating the solid parts will be dissolved. On evaporating the liquid the new celluloid-like substance remains in the shape of a translucid uncolored flexible mass burning slowly, which can easily be worked by rollers while still hot. Of course instead of camphor one can also employ other bodies, which by their action impart plasticity to the mixture in the preparation of celluloid, such as paratoluene sulfamid, the methylic ester of paratoluene sulfonic acid, naphthalene, the methylic ester of oxalic or phthalic acid, or the like.

According to our researches the above-described plastic compounds can be employed with great advantage for all industrial purposes for which the plastic compounds made from cellulose-xanthogenate and nitrocellulose are used, especially for the preparation of photographic plates, the so-called "films." These films are distinguished by their great stability. They can be kept for a long time without altering.

In order to carry out the manufacture of films, the above-mentioned bodies are dissolved in a suitable solvent, such as chloroform, and this solution is then spread on a glass plate and cautiously dried.

Having now described our invention and in what manner the same is to be performed, what we claim as new, and desire to secure by Letters Patent, is—

1. The herein-described new permanently plastic substance composed of acetyl derivatives of cellulose and such substances which by their action impart plasticity to the mixture, substantially as hereinbefore described.

2. The herein-described new plastic substance composed of the acetylized derivatives of cellulose and camphor which by its action imparts plasticity to the mixture, substantially as hereinbefore described.

In testimony whereof we have signed our names in the presence of two subscribing witnesses.

ARTHUR EICHENGRÜN.
THEODOR BECKER.

Witnesses:
OTTO KÖING,
F. A. RITTERSHAUS.